United States Patent [19]

Neale

[11] 4,281,511
[45] Aug. 4, 1981

[54] HYDRO-FLOW SUPRA-TURBINE ENGINE

[76] Inventor: Abas B. Neale, 3172 Ellington Dr., Hollywood, Calif. 90068

[21] Appl. No.: 124,982

[22] Filed: Feb. 27, 1980

[51] Int. Cl.$^3$ .............................................. F02C 3/30
[52] U.S. Cl. .................................. 60/39.53; 60/728; 415/53 T; 415/193
[58] Field of Search ................. 60/39.05, 39.53, 39.55, 60/728; 415/79, 53 T, 213 T, 143

[56] References Cited

U.S. PATENT DOCUMENTS

| 2,505,660 | 4/1950 | Baumann | 415/79 |
| 3,335,565 | 8/1967 | Aquet | 60/39.55 |
| 3,657,879 | 4/1972 | Ewbank et al. | 60/39.05 |

FOREIGN PATENT DOCUMENTS 410544  5/1934  United Kingdom .................... 60/39.55

*Primary Examiner*—Louis J. Casaregola
*Attorney, Agent, or Firm*—Poms, Smith, Lande & Rose

[57] ABSTRACT

A turbine engine operates at high pressure and at relatively low temperatures and revolutions per minute through the use of special carburetion, compressor, combustion unit, and turbine arrangements. The system is characterized by the use of water which is vaporized and concurrently reduces the temperature of the vaporized fuel and air mixture as compression occurs, and is not physically intermixed with the combustion gases until after initial combustion takes place. The compressor includes a pair of back-to-back, four stage composite compressors to which synchronized dual carburetion or meter-flow arrangements separately supply water and gasoline or other fuel, along with air. The water absorbs heat from the compression of both of the two compressors, and the resultant vaporous product gases are routed to the jacket of a combustion chamber in which the compressed fuel and air mixture is burned. Following initial ignition and some burning of the fuel, the superheated steam and combustion products are combined, and the combination is supplied to a multistage transverse flow turbine having in the order of 17 pressure stages. The turbine includes arrangements for directing the high pressure gases back and forth through the rotor blades at different radial distances from the axis of the turbine. Exhaust gases from the turbine are applied to a "floating" muffler, including a rotatable inner chamber to facilitate mixing exhaust gases with the ambient air, and to disperse the high moisture content of the exhaust gases.

52 Claims, 21 Drawing Figures

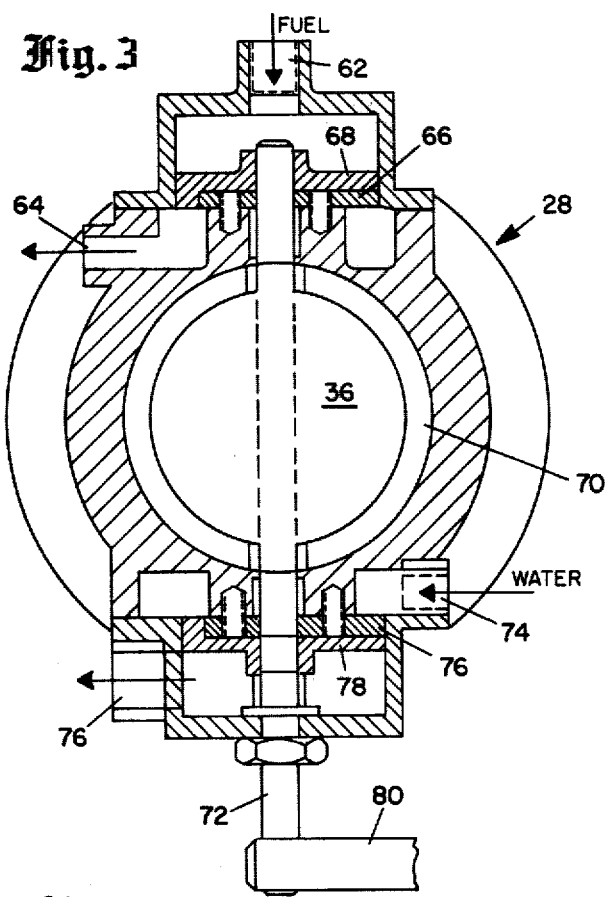
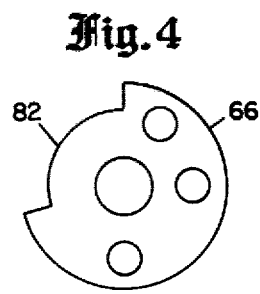
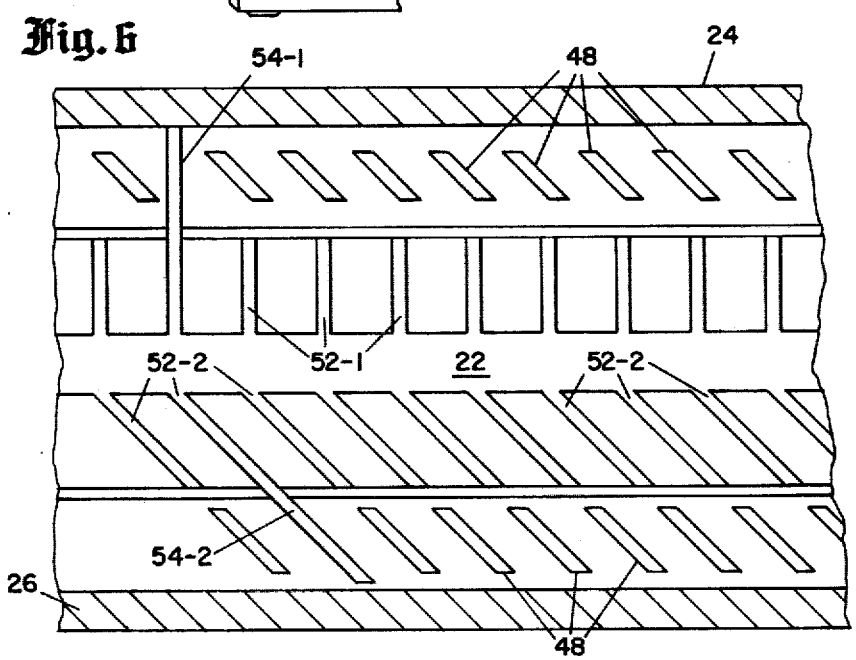

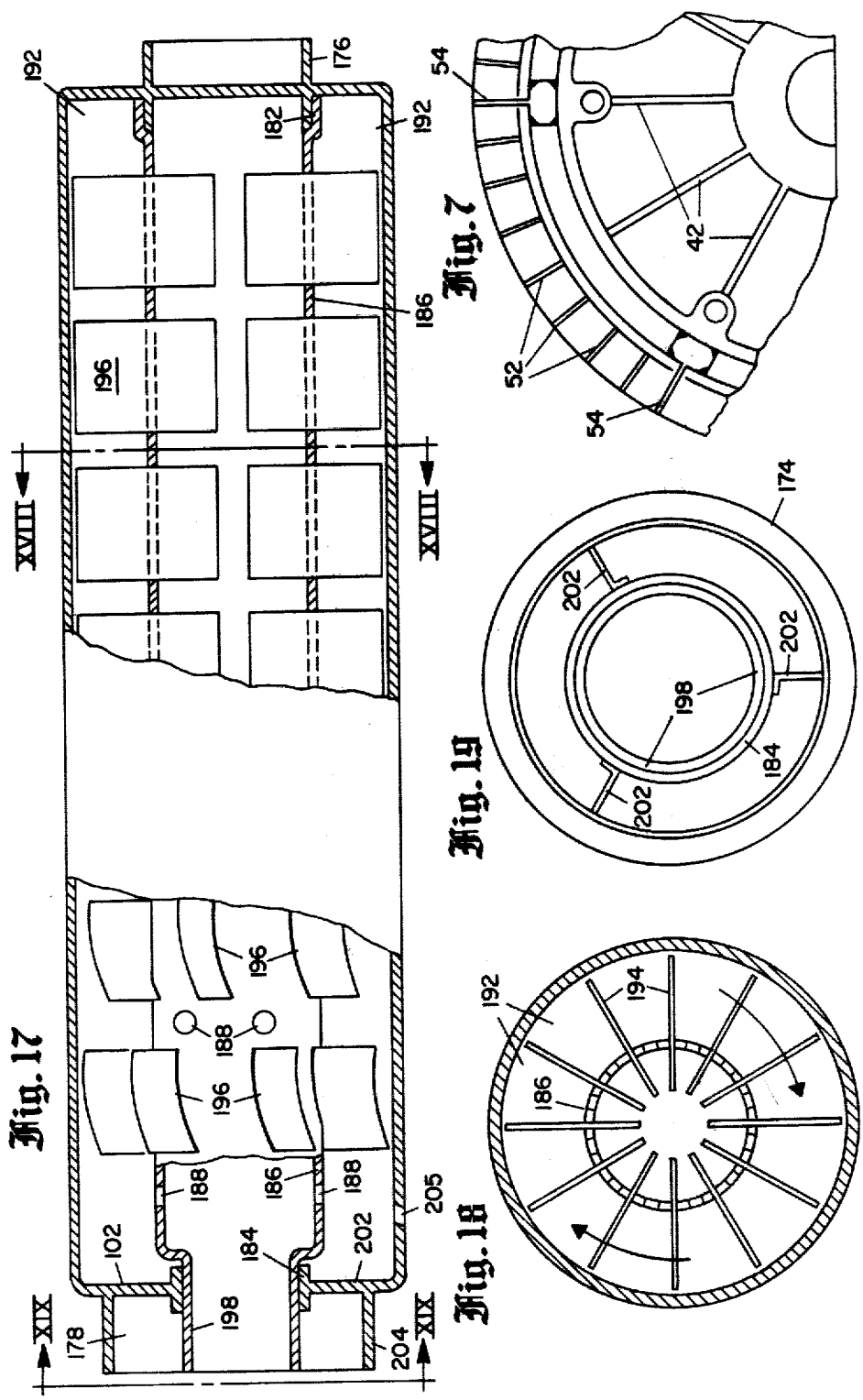

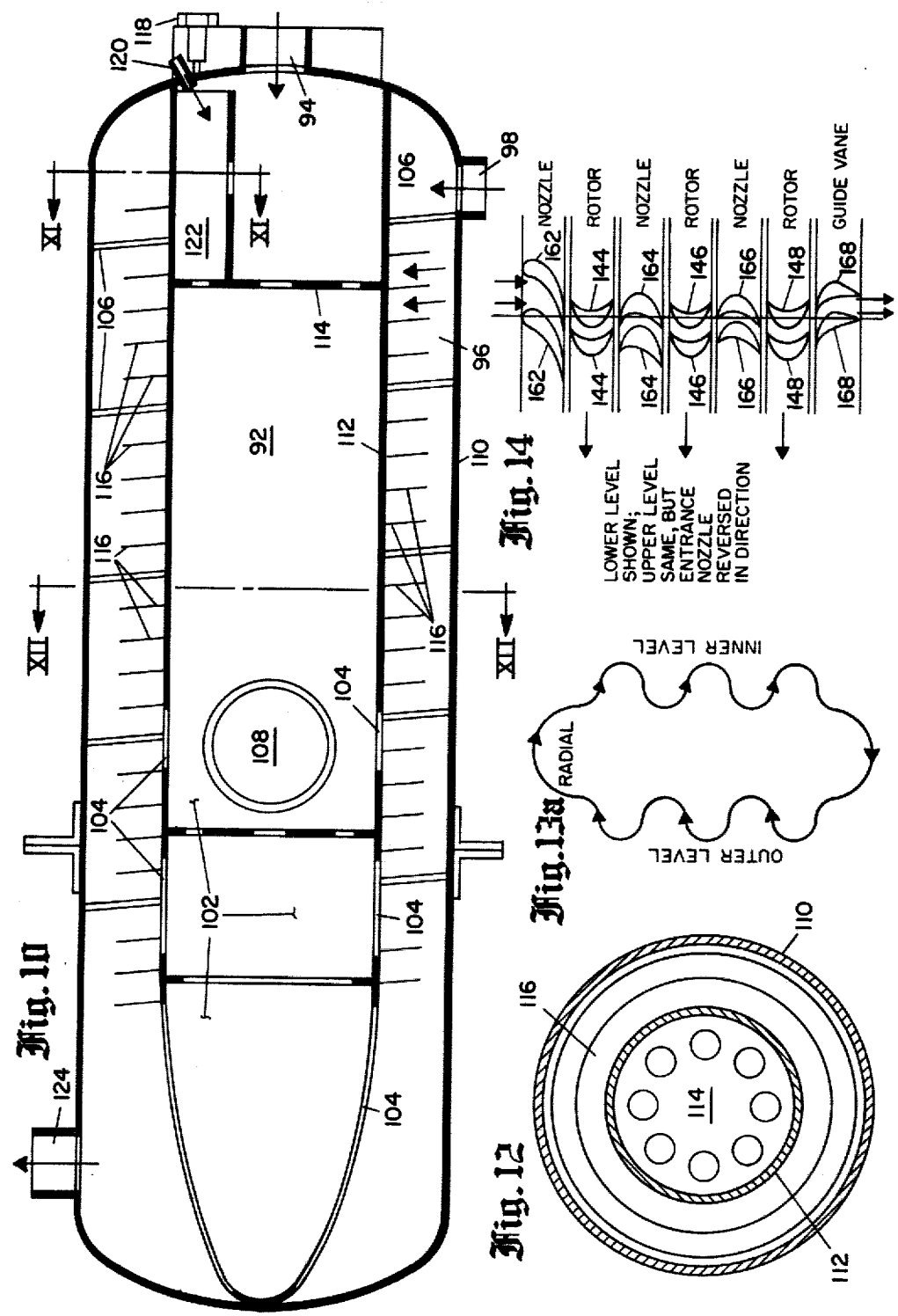

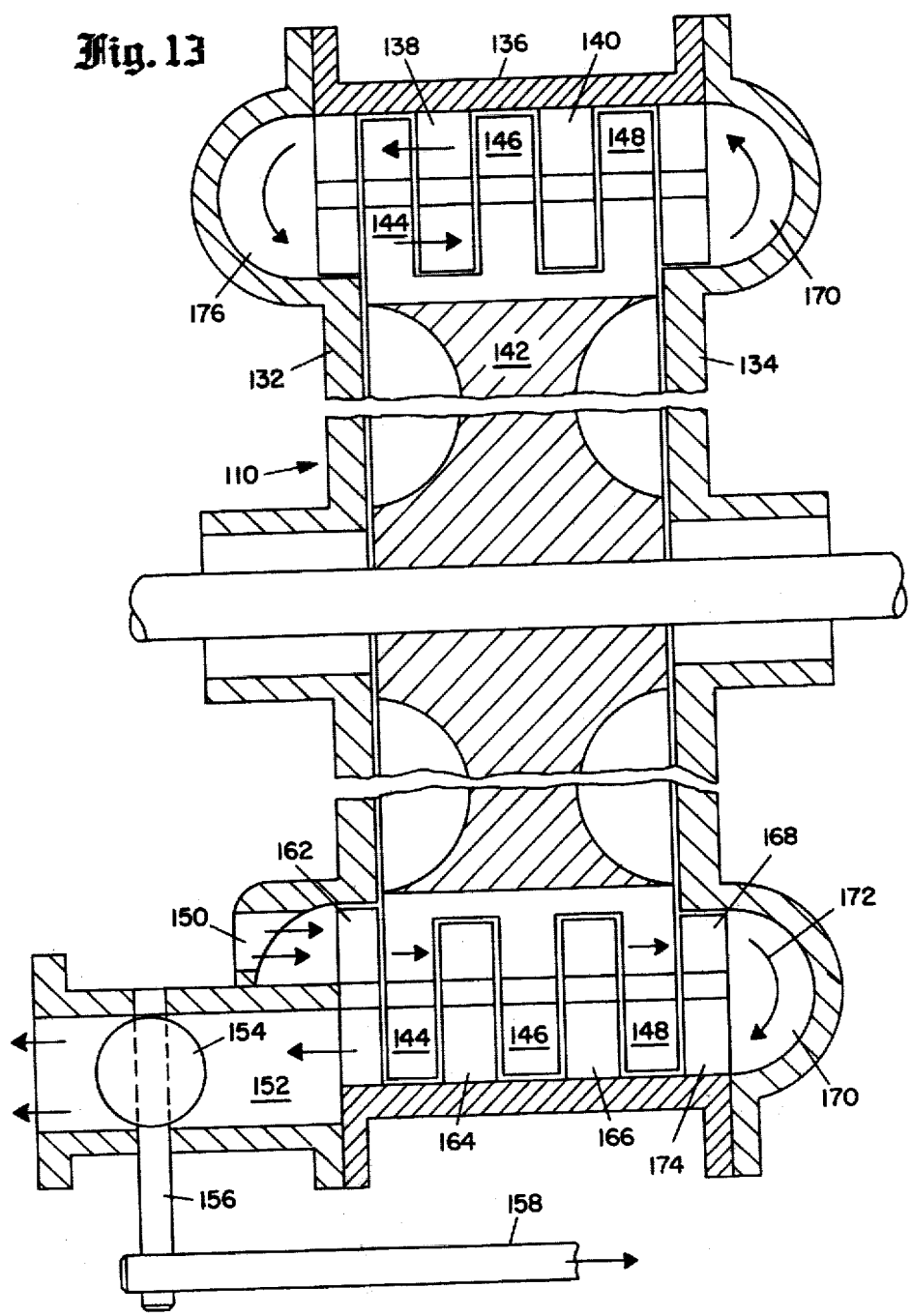

HYDRO-FLOW SUPRA-TURBINE ENGINE

FIELD OF THE INVENTION

This invention relates to high mileage turbine engines which use relatively small amounts of fuel.

BACKGROUND OF THE INVENTION

Present day turbine engines have a number of disadvantages including relatively high operating temperatures and speeds. These high operating temperatures and speeds require relatively exotic and costly materials, for the vanes, nozzles and other exposed parts; and the life of such turbine engines is not as long as would be desired. Furthermore, the high heat energy content resulting from these high temperatures can not be utilized effectively. In addition, the compressor employed in most turbine engines heats the incoming air to an elevated temperature corresponding to the compression ratio, and the power required for driving the compressor is a substantial portion of the output power of the turbine. Also, in most turbine engines, due to incomplete combustion a considerable amount of smog is developed which pollutes the atmosphere.

Accordingly, one important object of the present invention is to reduce the operating temperature and speed of turbine engines while concurrently increasing their efficiency.

Another object of the present invention is to reduce the energy required for the input compressor to turbine engine, thereby increasing the overall efficiency of the engine.

A further object of the invention is to reduce smog from engine exhausts.

Still another object is to increase the mileage of automobiles, thereby reducing fuel consumption.

SUMMARY OF THE INVENTION

In accordance with a relatively specific aspect of the invention, the input compressor to a turbine engine includes dual carburetion arrangements for metering proportional amounts of fuel, such as gasoline and water to a pair of compressors which are in heat transferring relationship with one another but have separate isolated compressor arrangements for water and air on the one hand and for fuel and air on the other hand.

In accordance with another specific feature of the invention, the output from the compressor in which fuel and air have been compressed is connected to a primary combustion chamber where it is ignited and burned; the output from the other secondary compressor in which water has been vaporized and compressed along with input air, is routed to a secondary superheating chamber which encloses the primary combustion chamber; and toward the output from the combustion chamber the superheated steam and combustion products are combined in a mixing chamber.

In accordance with a further feature of the invention, the combined superheated steam and combustion products from the combustion chamber are supplied to a multi-pressure staged transverse flow turbine in which the high speed gases are routed back and forth through inner and outer transverse parallel paths including successive nozzles or guide vanes and rotor blades to successively extract energy from the gases as they pass through and drive the rotating blades. This turbine can efficiently operate at lower temperatures and revolutions per minute than conventional turbines.

A "floating" muffler may also be provided as part of the system, to mix additional ambient air with the combustion products, thereby further cooling the exhaust, reducing the noise level, and dispersing moisture from the exhaust.

Advantages of the present invention include (1) substantially isothermal compression with a consequent reduction in the energy required to operate the compressor, (2) lower temperature and lower turbine speed operation, so that exotic materials which are employed in conventional turbines need not be employed, and (3) a significant increase in efficiency and reduction in costs resulting from the foregoing factors.

From one aspect the present invention involves the use of what may be termed a "magic" fuel which is generated by combining superheated steam with hot combustion gases, to provide the advantageous results described herein.

Other objects, advantages, and features of the invention will become apparent from a consideration of the following detailed description and from the accompanying drawings.

BRIEF DESCRIPTION OF THE DRAWINGS

FIG. 3 is a cross-sectional view of the fuel, air, and water flow control unit which may be employed in the implementation of the present invention;

FIGS. 4 and 5 are valve elements employed in the flow control unit of FIG. 3;

FIG. 6 is an unfolded view looking inward from the outside of the compressor and vaporization unit of FIGS. 1 and 2;

FIG. 7 is a side view of a portion of the impeller employed in the unit of FIGS. 1 and 2;

FIG. 10 is a cross-sectional view of the "triad" combustion chamber, to which the separate outputs from the dual compressor and vaporization unit of FIGS. 1 and 2 are supplied;

FIGS. 11 and 12 are cross-sectional views taken along lines XI—XI, and along lines XII—XII, respectively, of FIG. 10;

FIG. 13 is a cross-sectional view through the "hydraflow" transverse flow turbine which may be employed in the implementation of the present turbine system;

FIG. 13a is a diagram showing the flow path in the turbine of FIG. 13;

FIG. 14 is a diagram indicating the nozzle and rotor configurations which may be employed in the turbine of FIG. 13;

FIG. 17 is a partial cross-sectional view of a "floating" muffler which may be employed in the implementation of the present system;

FIGS. 18 and 19 are views taken along lines XVIII—XVIII, and lines XIX—XIX, respectively, of FIG. 17.

DETAILED DESCRIPTION

Figure 1:
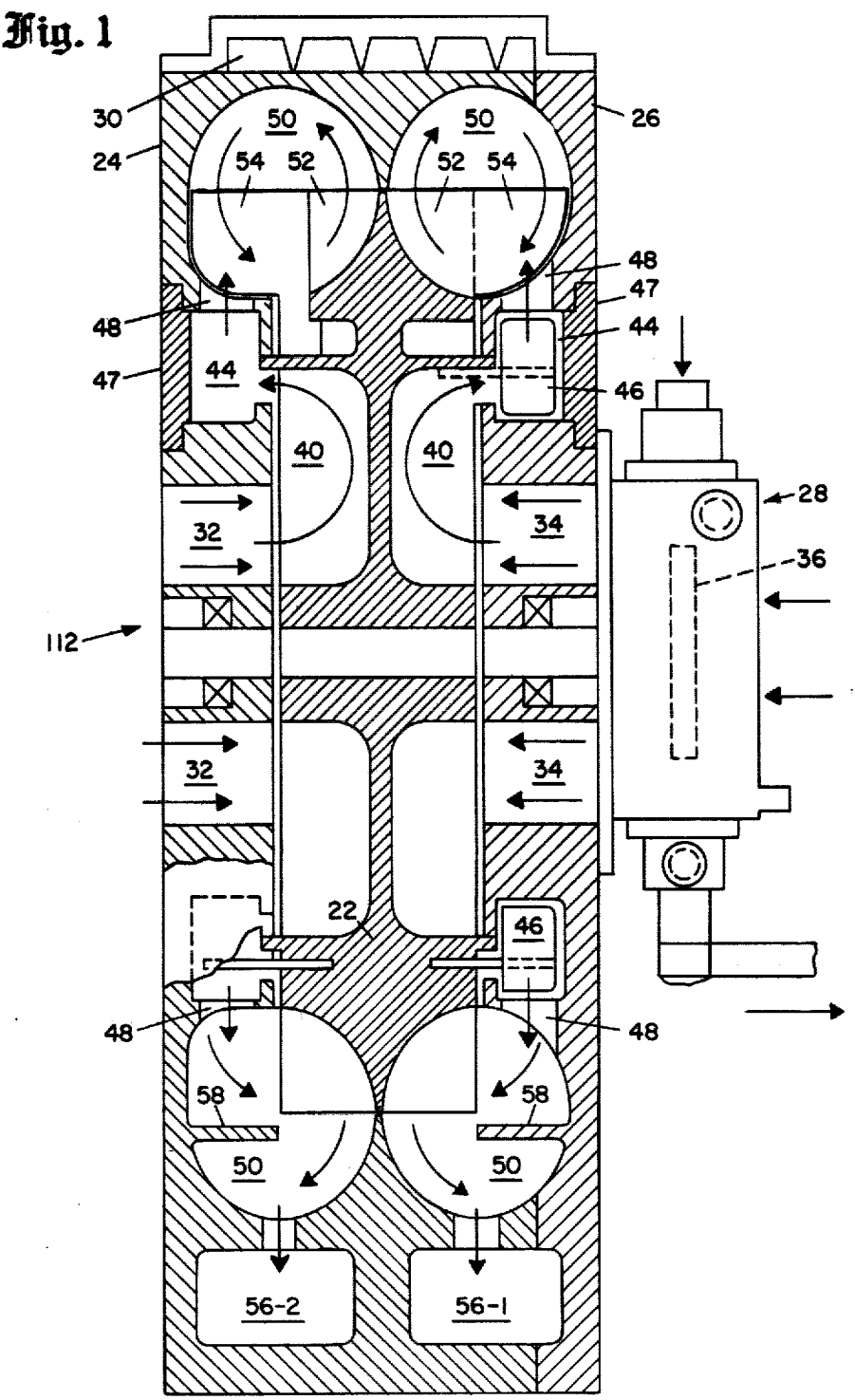
FIG. 1 is a cross sectional view of a dual compressor and vaporiztion unit which may be employed in the implementation of the turbine system of the present invention.

Referring more particularly to the drawings, FIG. 1 shows a multiple stage composite "WHIRLO" compressor and vaporizer unit having a central rotor 22 and a housing made up of a principal housing member 24 and a secondary housing unit 26 which encloses the rotor from the right-hand side as shown in FIG. 1 following assembly of the rotor unit 22 in position. The compressor and vaporization unit of FIG. 2 essentially includes two back-to-back units, with the unit on the left providing compressed air and vaporized water or steam, and the right-hand side as shown in FIG. 1 providing compressed air and vaporized fuel, such as gasoline, diesel fuel, kerosene or the like.

The air, fuel, and water meter valve or carburetion unit 28 is shown located to the right in FIG. 1, and this unit will be shown in greater detail below.

Around the periphery of the compressor and vaporization unit, is an optional water jacket 30, which may be employed to provide additional cooling for the dual compressor and vaporization unit. Input air is supplied through the openings 32 and 34 located near the center of the unit. The flow of air to the input 34 on the fuel side of the unit is controlled by the rotation of the circular vane 36 forming part of the flow control apparatus. This vane is of assistance in maintaining the desired stoichiometric ratio of fuel to air, as discussed in greater detail below.

Figure 2:
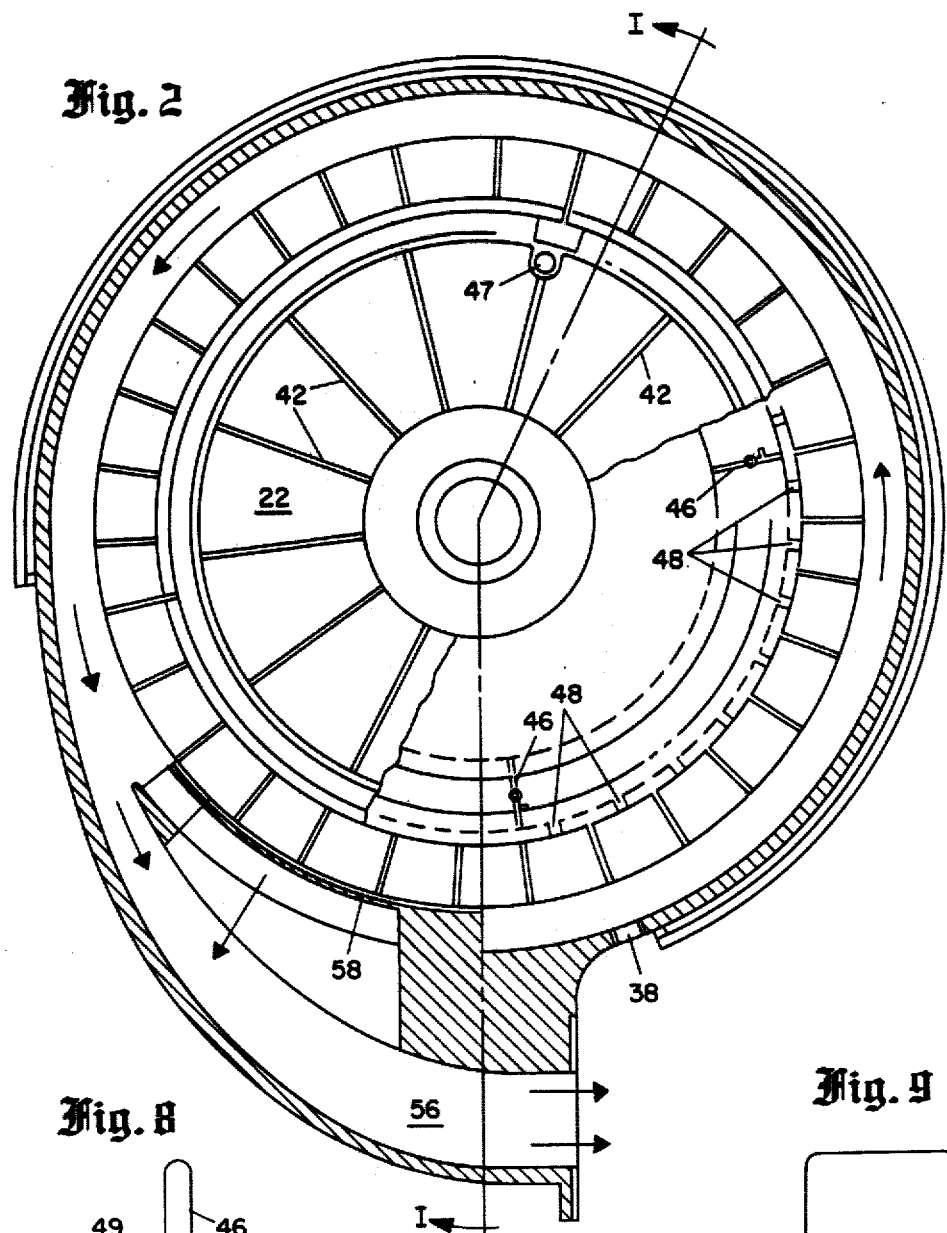
FIG. 2 is another cross-sectional view of the unit of FIG. 1 taken in this case at right angles to the axis of the unit.

As best shown in FIG. 2, the water and fuel, such as gasoline, are supplied through the input orifices 38 near the periphery of the unit.

The compression is accomplished in four stages, with the initial centrifugal stage being accomplished in the zone 40 under the force of the rotating impeller blades 42 as shown, for example, in FIG. 2. The second stage involves the peripheral channels 44 into which a series of three or more (as desired) vanes 46 may extend to provide positive displacement through the openings 48 into the third compression stage chamber 50. Preferably an odd number of vanes are employed and the number will depend on the size of the compressor.

Figure 8:
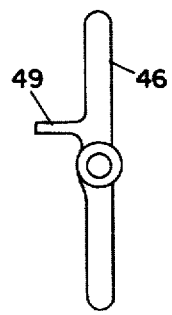
FIGS. 8 and 9 are two views of an impeller vane of the type employed at certain selected points in the assembly of FIGS. 1 and 2.
Figure 9:
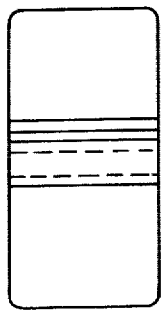

The vanes 46 may be shaped as shown in FIGS. 8 and 9, rotatably mounted into the rotor 22 on pins 47 (see FIG. 2). When the rotor 22 is assembled with the housing numbers 24 and 26, the vanes 46 are oriented nearly parallel to the circumference so that they will pass the lip of the channel 44. Thereafter, in operation the blades rotate to a radial position within channel 44 and are held in this position by air pressure as the impeller 22 rotates and by stops included in the pivot arrangements for vanes 46. Alternatively, if desired, vanes such as blades 46, but fixed against rotation, may be inserted through openings such as that closed by cover plate 47 one on each side, as shown in FIG. 1. Incidentally, the vanes 46 rotate with the small transverse extension 49 forward, to assist the positive displacement action of vanes 46 in forcing the compressed air outward from the channels 44 through the openings 48.

In the third stage chambers 50, the air is further compressed and is continuously whirled by the action of the shorter vanes 52 which terminate along a line co-extensive with the normal edge of the impeller or rotor 22, as well as through the operation of occasional vanes 54 which extend across the full width of the peripheral chambers 50.

Now, referring to FIG. 2, liquid, either water or fuel, depending on whether the left or right side of the compressor is being considered, is supplied through the opening 38. With the compressor rotor rotating at high speeds in the counterclockwise direction as shown in FIG. 2, the liquid supplied through the opening 38 is soon broken up into droplets and rapidly vaporized as it makes the transit around the compressor from the inlet openings 38 to the exhaust passageways 56. Incidentally, the metal web or channel 58 as shown in both FIGS. 1 and 2 forces the entrapped compressed air and vaporized liquid to flow into the exhaust passageways 56.

Concerning another aspect of the compressor and vaporization apparatus of FIGS. 1 and 2, the compression of air would normally produce a very substantial increase in temperature. However, much of the temperature which would otherwise be generated and which would appear in the gases at the output from the unit, is absorbed by the heat of vaporization of the water in the left-hand side of the unit as shown in FIG. 1. This feature by which the back-to-back compressors cooperate to produce substantially isothermal compression, is an important factor contributing to the overall efficiency of the present turbine system.

Various details of the three-way flow carburetion or meter valve unit 28 shown to the right in FIG. 1, will now be considered in connection with FIGS. 3, 4 and 5 of the drawings. The cross-sectional view of FIG. 3 is taken at right angles to the plane of the paper in FIG. 1. More specifically, the three-way meter valving unit of FIG. 3 includes a fuel control arrangement involving the input 62, the output 64 and a valving arrangement including the disks 66 and 68. The air flow control element 36 rotates through 90 degrees from the position shown in FIG. 3 in which most of the air flow through the air channel 70 is blocked, to a position in which the vane is rotated by 90 degrees about the axis of the rod 72 so that it is parallel to the direction of air flow through channel 70. Finally, the water flow is controlled synchronously with the control of fuel and air between the water input orifice 74 and the output 76. The water valve includes fixed member 76 and a rotatable disk 78 operating in a manner similar to the two elements 66 and 68 associated with fuel flow.

The control shaft 80 is connected to a crank arm secured to the shaft 72, and rotation of shaft 72 synchronously controls the flow of fuel, air and water to the compressor and vaporization units disclosed hereinabove in connection with FIGS. 1 and 2. More specifically, the control disk 36 is pinned to the rotatable shaft 72, as are the disks 68 and 78, controlling fuel and water flow, respectively. It may be noted that both the fuel and the water valve arrangements include annular chambers for supplying and receiving the liquid. In the case of the fuel, the fixed element 66 is provided with a sector 82 which is cut away from the full periphery. The fixed element 76 for the water control is formed in the same manner. The movable element 68 and 78, for fuel and water, respectively, has a configuration as shown at FIG. 5 with a corresponding cut-away sector 84, and an idle orifice 86. With the vane 36 oriented in the blocking configuration for idle operation of the turbine system, the orifice 86 will overly the sector 82 of the fixed element, and only a small amount of liquid, either fuel or water, will pass through the valves. On the other hand, when the rod 80 connected to the accelerator is actuated to turn the shaft 72 by 90 degrees to the full power output position, disk 36 will be rotated to a position parallel with the air channel so that full flow of air is facilitated and the two cut-away portions 84 and 82 will be lined up to permit high volumes of fuel and water to be supplied to the input orifices 38, as shown in FIG. 2.

In all cases, the fuel and air valves are arranged to provide a substantially stoichiometric ratio of fuel to air. This ratio is about eighteen to one, or about 0.06 by weight of gasoline to air for complete combustion. Similarly, a water-to-fuel weight ratio in the order of approximately two or three to one, or more is preferred in order to obtain substantially isothermal compression, and to permit the generation of superheated steam under all operating conditions. Slight variations of the shaping of the cut-away sectors 82 and 84 as shown in FIGS. 4 and 5, may be required in order to maintain optimum operating conditions throughout the power range of the present turbine system.

As mentioned above, output fuel and water are separately coupled from the output orifices 64 and 76 associated with the carburetion or meter-valve unit 28 to the inputs 38 on the right and left-hand sides of the compressor and vaporization unit of FIGS. 1 and 2.

Before proceeding to a consideration of the combustion unit, reference is made to FIG. 6 which is a view, unfolded in nature, looking inward toward the axis of the compressor and vaporization unit from within the outer chambers 50. In FIG. 6 the outer housing walls 24 and 26 may be noted and the central rotor 22 as well as the angled slots 48 through which air is forced by the rotation of the vanes of 46. The inlet holes 48 to the third compression stage (50) start at the bottom of the compressors and extend for 90 degrees to 180 degrees, and are sufficiently large to permit full flow into the third stage and to vaporize the fuel or water supplied through openings 38.

In FIG. 6, two different configurations of the vanes 52 and 54 are shown. Above the center line of the rotor 22, the shorter vanes 52-1 and the longer vanes 54-1 are oriented perpendicular to the center line of the rotor. However, in the showing below the center line of rotor 22, the shorter rotor blades 52-2, and the longer rotor blades 54-2 are angled at 45 degrees relative to the center line of the rotor. Either of these two angles will be effective, and other intermediate angles, such as 30 degrees, from the orientation of blades 52-1, for example, could also be employed effectively. The extended blades 54 may either be formed as an integral part of the impeller 22, or may be welded to it, as indicated in FIG. 7. The purposes of the extended vanes 54 are to create suction, to increase the pressure head, and to clear the flow path.

Figure 11:

Now, turning to the triad combustion chamber, as shown in FIGS. 10 through 12, it includes a central combustion compartment or chamber 92, having an input 94 connected to receive the compressed air and vaporized fuel from one of the exhausts 56-1 of the compressor and vaporization unit; and a superheat chamber 96 in heat coupling relation with the combustion chamber 92, and having an input 98 coupled to receive compressed air and water vapor or steam from the exhaust 56-2 of the compressor/vaporization unit; and a mixing chamber 102 in which the gases from chambers 92 and 96 are mixed as a result of the intercoupling openings 104.

Incidentally, the chamber 96 includes partitions 106 which force the helical passage of the compressed air and water vapor around and along the length of the combustion chamber 92. In the process of flow of steam and compressed air through the helical chamber 96, the water vapor or steam becomes superheated and its temperature is further increased, with the concurrent increase of energy content of the gases. After passing about two-thirds of the way down the combustion chamber 92, mixing is permitted by the provisions of the openings 104. If desired, the combustion chamber may be mounted centrally with respect to the drive shaft of the turbine which is shown passing through the unit at reference numeral 108.

Considering the construction of the "triad" combustion unit in some detail, it includes the outer wall 110 enclosing the outer superheat chamber 96, and the inner concentric wall 112 which separates the central combustion chamber 92 from the superheat chamber 96, and also includes apertured baffle plates 114 along the length of the central combustion chamber and radiating fins 116 for energy transfer between the combustion chamber 92 and the superheat chamber 96. Stoichiometric combustion normally takes place at a temperature of approximately 3600 degrees F. Locating the combustion chamber 92 within the superheat chamber or jacket 96 allows heat from the combustion chamber to be absorbed by the water vapor, which becomes superheated steam, instead of wasting the heat by radiation into the atmosphere.

Concerning ignition, a glow plug 118 or a red hot wire and a starter fuel inlet 120 appear at the upper right-hand side of FIG. 10, and are provided to ignite the stoichiometric fuel-air mixture. The chamber 122 is a glow chamber which also facilitates re-ignition of the unit in case of accidental flame-out or cessation of combustion.

Following mixing in chamber 102, the combined combustion products and energetic superheated steam and compressed air are supplied to the conduit 124 for coupling to the turbine.

Referring now to the turbine of FIG. 13, it is a transverse flow, pressure stage-impulse turbine. The turbine has seventeen active stages and one augmenting stage. It is an integrated partial admission configuration. Every stage has partial admission, yet the total circumference of the rotors is covered and there are no blank spaces.

Now, proceeding to a consideration of the detailed structure, it includes a stator structure having two end support members 132 and 134, a central stator portion 136 carrying stationary gas nozzle vanes 138 and 140, and a central rotor structure 142 carrying sets of radially extending rotor blades 144, 146 and 148. The turbine inlet 150 is connected to receive the high energy gases from the outlet 124 of the combustion chamber of FIG. 10. After many transits back and forth through the stationary nozzles and the rotating blades of the turbine structure, as described below, the exhaust gases exit from the turbine structure at conduit 152, which in turn is provided with a vane 154 which is synchronously operated with the accelerator controlling the input flow to the compressor unit. This is accomplished by the pivot shaft 156 on which the control vane 154 is mounted; and the orientation of the shaft 156 is controlled in turn by rod 158 connected to a crank on shaft 156. The purpose of the control vane or valve element 154 is to reduce exhaust gas flow when the amount of fuel is reduced under less than full power operation. As the vane 154 shifts toward the closed position under lighter load conditions, the turbine blade passageways will be kept full, and turbulence will thereby be eliminated, with efficiency being kept at or about design point efficiency.

The flow through the stationary nozzles and the rotating blades of the turbine is somewhat complex, and may usefully be described in connection with FIG. 13a, FIG. 14, and FIGS. 15 and 16. In a general way, the transverse flow turbine operates as follows: First, the gases supplied through input 150 are directed by the nozzle vanes 162 toward a circumferential path which also has a substantial axial component, as indicated by FIG. 14. The gases then impinge on the vanes 144 which are secured to the rotor, and this imparts torque to drive the rotor 142. The gases from the rotor blades 144 impinge on the stationary nozzle vanes 164 which redirects them to drive the next successive set of rotor vanes 146. As shown in FIGS. 13 and 14, the next set of stationary nozzle blades are designated by reference numeral 166, the subsequent rotor blades by the reference numeral 148, and the guide vanes 168 direct the exhaust gases outwardly parallel to the axis of the rotor into the guide channel 170.

The curvature of the guide channel 170 directs the gases as indicated by arrow 172 to the input nozzles 174 at the outer zone of the turbine. The high pressure gases then go back across the outer driving zone of the turbine, successively impinging on the outer ends of the blades 148, the outer portion of the nozzle vanes 166, the outer area of the rotor vanes 146, and then impinge on nozzle vanes 164 and rotor vanes 144. Incidentally, the cross-sections of the rotating blades, and the intermediate nozzles remain the same throughout their radial extent, both at the inner and outer active areas. This is a result of the turbine being pressure staged. By this time, with the rotation of the rotor, the gases are displaced around the circumference of the turbine, and are re-directed toward the inner portion of the turbine blades and nozzles by the guide channel 176 in a zone circumferentially displaced from the turbine inlet 150. The diagram of FIG. 13a shows diagrammatically the flow path of the high pressure gases as they successively transit the turbine blades between the two peripheral guide channels 170 and 176.

Figure 15:
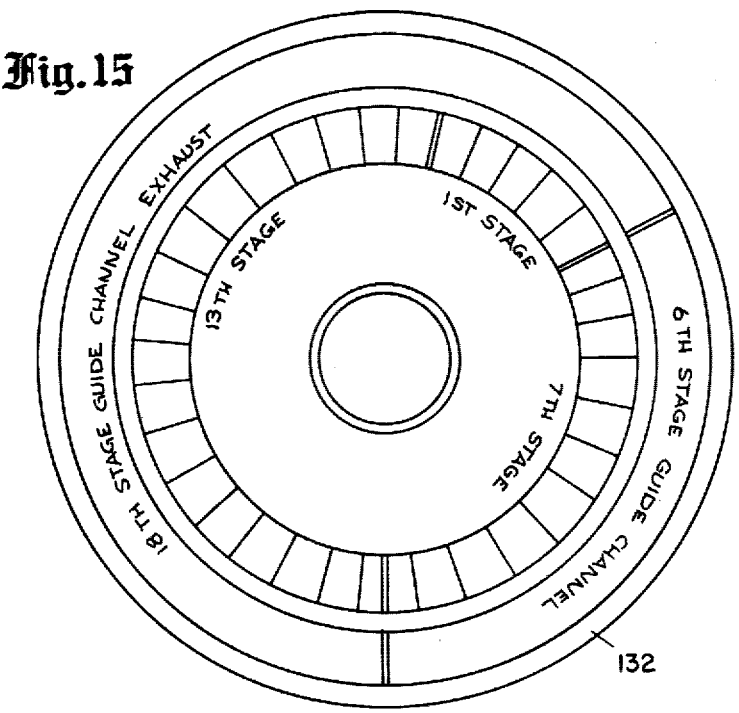
FIGS. 15 and 16 show the successive stages of the nozzle and guide van arrangements of the turbine of FIG. 13.
Figure 16:
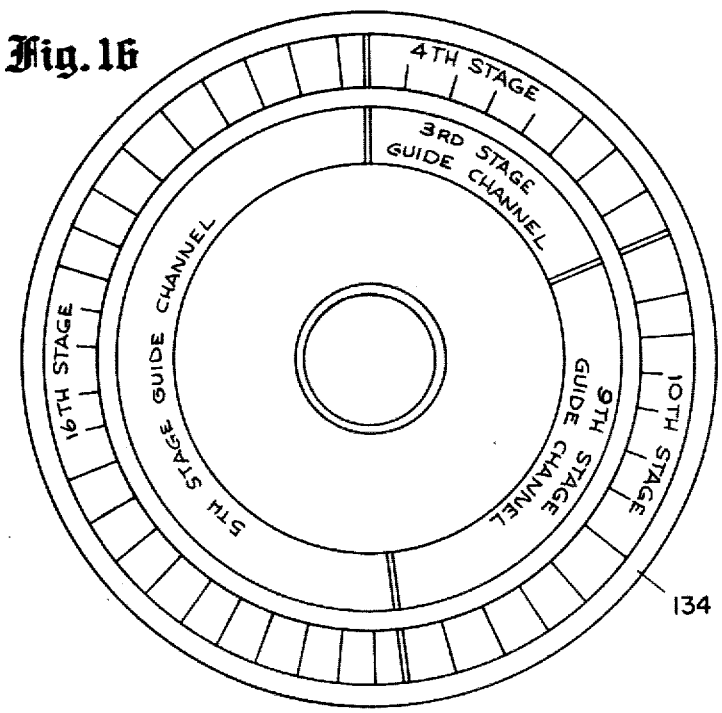

FIGS. 15 and 16 are schematic showings of the relative angular orientation of the successive stages of nozzle and turbine blades interaction. FIGS. 15 and 16 are both taken looking from left to right in FIG. 13, with FIG. 15 being taken at the left hand side of FIG. 13, and FIG. 16 being taken through the rotor near the right hand side of FIG. 13, with the rotor rotating in the clockwise direction. From turbine inlet 150 (FIG. 13) the gases drive stage 1 at the inner blade area on blade 144 (see FIG. 15), and then the second stage (not shown in FIGS. 15 and 16), then proceeding to inner stage 3 and outer stage 4 (see FIG. 16), then in FIG. 15, stage 7 may be seen, shifted angularly with the rotation of the rotor. To follow this progression, note that the stage numbers set forth on FIGS. 15 and 16 correspond to the small arabic numbers 1 through 18 which appear on the turbine nozzles and blades in the lower portion of the turbine as shown in FIG. 13.

Following the successive transits back and forth across the turbine blades as indicated in the diagrams of FIGS. 15 and 16, the gases are exhausted through the channel 152, which is of considerable angular extent to couple all of the exhaust gases.

From the turbine exhaust channel 152, the exhaust gases are coupled to the "floating" muffler, as shown in FIGS. 17, 18 and 19. The muffler of FIGS. 17 through 19, is preferably made of stainless steel, and includes an outer fixed housing 174 having an input 176 and an output 178. Mounted for rotation within the housing 174 is a cylindrical rotatable inner channel 186, which is mounted for rotation at bearing points 182 and 184. Except for the initial input portion of its length, the inner tube 186 is provided with a series of apertures 188, to facilitate mixing of the exhaust admitted through channel 176 and ambient air supplied through the openings 192 between the support vanes 194. Mounted on the rotating member 186 are a series of angled vanes 196 which have the effect of further intermixing the exhaust and the ambient air by causing rotation and turbulence within the chamber 174. As indicated in FIG. 19, the output end of the muffler shows the reduced end portion 198 of the rotating cylinder 186, which is mounted on the bearing 184. The output end of the muffler is virtually open, with the bearing 184 being supported from three support members 202 extending from the reduced diameter cylinder 204 into the bearing structure; and a drainage hole 205 is located near the output end of the muffler.

Figure 20:
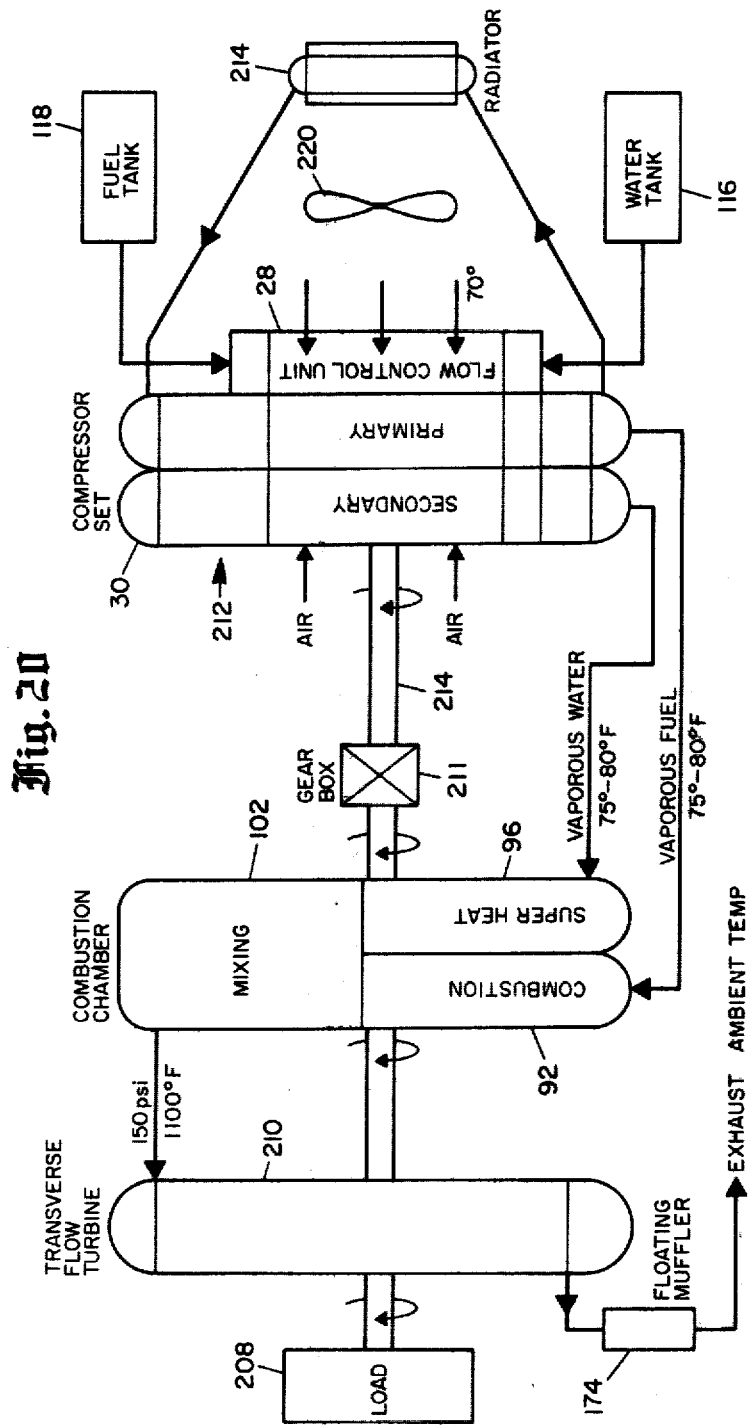
FIG. 20 is a diagramatic showing of the complete turbine engine system of the present invention.

The final figure of the drawings, FIG. 20, is a diagrammatic showing of a complete engine illustrating the principles of the present invention. In FIG. 20, the outer housing 174 of the floating muffler is shown at the lower left. Proceeding from left to right, the load 208 is coupled to the shaft of the turbine 210, and to the right of the turbine is shown the "triad" combustion chamber including the combustion zone 92, the superheat chamber 96, and the mixing chamber 102. To the right of the combustion chamber is the gear box or speed changing unit 211, which drives the compressor/vaporizer unit 212 through the shaft 214 at the optimum operating speed. The carburetor or meter valve unit 28 is shown at the right of the dual compressor/vaporizer unit 212. The water jacket 30, which is optional, may be connected to a radiator 214, and can also serve as a water tank or reserve water tank. Water and fuel are supplied to the carburetor or meter valve unit 28 from the supply tanks 216 and 218, respectively. A fan 220 may provide supplemental cooling and additional air directed to the carburetor or metering valve unit 28.

Now that a step-by-step description of one turbine engine system embodying the principles of the invention has been completed, it is useful to mention some other aspects of the invention. In general, it is to be noted that, while conventional turbines operate at temperatures above 1500 degrees F., and at speeds of many thousands of revolutions per minute, the turbine of the present invention operates at lower temperatures, in the order of 500 to 1500 degrees F. and preferably 600 to 800 degrees F., and at speeds of only a few thousand, such as four thousand RPM or less. For automotive applications, it is contemplated that the turbine unit will have a steady state temperature in the order of about 600 to 700 degrees F.

As discussed in detail above, many of the advantages of the present invention arise from the use of substantial quantities of water, which may be in the order of two or three or more times the weight of the fuel which is employed. By utilizing the cooling water in the dual compressor, it is estimated that the specific fuel consumption of the engine will be about 0.10 to 0.12 pounds per horsepower per hour, as compared to about 0.50 for a gas turbine, and about 0.75 and up for a conventional internal combustion piston engine. At this rate of combustion it is estimated that the engine system of the present invention will yield in the order of 75 to 100 miles per gallon or more in automotive applications, depending on the size of the automobile and the power level of the engine.

It may also be noted that the present invention has a number of significant advantages for automotive applications, particularly as compared with internal combustion engines, and the high temperature, high speed turbine engines which have been previously proposed. Specifically, as compared with conventional piston-type automotive internal combustion engines, there will be no tuneups, no distributor, no points, and no carburetor to be adjusted at very short intervals. Further, the present engine system includes no cam shaft, no crank shaft and associated balancing weights, and no torsional vibration. The engine does not require any regeneration, and accordingly, none of the bulky regenerator rotors with their power-wasting gearing systems are required. Further, because of the lower speed, it will not have a high pitched whine and no need for noise insulation. In view of the low temperature operation and the geometry of the triad combustion chamber, there will be no need for heat insulation. The low temperature operation also has the advantage that no significant nitrogen oxide compounds will be present in the exhaust. The relatively low speed of the engine, in the order of 4,000 revolutions per minute or less means that no extreme precision or special machining accuracy or tolerances are required for the engine. The problem often encountered in turbine engines known as "turbine-lag" will not be present, in view of the positive displacement arrangements in the compressor, and the turbine exhaust control which maintains proper operating pressure and low turbulence within the turbine. The excess energy involved in the difference between the combustion temperature of approximately 3600 degrees F. and the turbine flow temperature which may be 600 degrees to 800 degrees or thereabouts, will be absorbed as superheated steam which will enhance the performance and efficiency of the system and avoid radiation losses which would otherwise occur. The superheated steam will increase the density of vapor flow, thus increasing the impetus transferred to the turbine rotor and further increasing the performance of the system. As a collateral feature, the floating muffler will be instrumental in diffusing the steam content of the exhaust and preventing fogging at the exhaust.

As a further collateral feature, the compressor is operated from the turbine through a speed changing unit 211 so that their speeds can be individually optimized without stress and vibration problems.

The turbine engine system of the present invention has been designed to operate over a broad range of relatively low temperatures and low rotational speeds. In accordance with one of a number of design calculations, a speed of 4300 revolutions per minute, and an input temperature of the gases to the turbine of about 1100 degrees F. were selected. The turbine design for these parameters includes a blade pitch diameter (P.D.) for the inner stages of approximately 15.25 inches and of about 16.50 inches for the outer stages. The operative blade height is approximately one-half inch for the inner stages and also one-half inch for the outer stages, with about one quarter inch separation. The temperature drops about 35 degrees F. in each inner stage and about 44 degrees F. in each outer stage, with U/V being held substantially constant. The resulting output temperature of the exhaust gases is in the order of 400 degrees F. Incidentally, with lower input temperatures to the turbine, in the order of 600 to 700 degrees F., the turbine rotor speed would be in the order of 2500 to 3000 RPM. Although the design parameters for the compressor and combustion chamber may vary substantially, it is contemplated that the combustion chamber could have an outer diameter of eight inches or less, and that the dual compressor could have a diameter of ten inches or less, and a thickness of about four inches.

Incidentally, if conventional design methods for the turbine were employed to operate on the output from the combustion chamber, one design would yield a turbine with two disks or rotors (two stages), with each having an O.D. of about 3.5 to 4.0 inches, with operative blade heights of about one-quarter inch or less, and operating at a speed of about 70 to 80 thousand R.P.M.; or alternatively, a design with eighteen stages, each using a separate rotor, but involving partial admission turbine arrangements. In both alternatives, the losses would have been very high. Of course, the arrangements of the present invention avoid these losses and inefficiencies, as well as permitting operation at lower temperatures and speeds all as discussed hereinabove, through the use of the transverse flow principles and using only two or three disks.

In conclusion, it is understood that the invention is not limited to that precisely as illustrated and described hereinabove. Instead of the specific compressor and vaporization arrangements disclosed herein, other arrangements could be provided in which heat transfer between compressed and vaporized fuel, and compressed and vaporized water are provided. Similarly, other arrangements could be employed for initially burning the fuel in isolation from the compressed air and superheated water vapor and subsequently combining them; and alternative multistage turbine arrangements could be employed. Also a series of disks may be mounted on the turbine shaft, instead of using a single disk. Turbine vanes can be attached to the disks by the fir-tree type of attachment by welding, by forming the vanes integral with the disk, or they may be assembled by any other suitable method to suit the design. Accordingly, the invention is clearly not limited to that precisely as disclosed herein.

What is claimed is:

1. A high pressure, low operating temperature, high efficiency turbine engine system comprising:
    dual input flow control apparatus including means for controlling an input flow of fuel, and for separately and concurrently controlling a flow of input water;
    dual compressor and vaporization apparatus including a primary air compressor, and means for feeding fuel from said flow control apparatus into said primary air compressor for complete vaporization as the air is compressed; and a secondary air compressor in heat transferring juxtaposition with said first air compressor, and means for feeding water from said flow control apparatus into said secondary compressor for complete vaporization of said water vapor as the air is compressed and heat is absorbed from said primary compressor; and means for separately providing compressed air containing vaporized fuel, and compressed air containing water vapor from said dual compressor apparatus;

a three chamber combustion assembly having a combustion chamber for burning said vaporized fuel and its associated compressed air, said combustion chamber having an associated superheating chamber in heat transferring relationship with said combustion chamber, and means for supplying the compressed air and water vapor from said dual compressor to said superheating chamber to superheat the water vapor, and means including a mixing chamber for receiving the output from the combustion chamber following initial burning, and the superheated steam and compressed air from said superheating chamber, and thoroughly commingling them;

a low temperature, low speed turbine; and means for supplying the mixed output from said combustion assembly to drive said turbine.

2. A turbine engine system as defined in claim 1 wherein said turbine is a multistage transverse flow turbine.

3. A turbine engine system as defined in claim 1 wherein the compressors included in said compressor and vaporization apparatus are multi-stage composite compressors.

4. A turbine engine system as defined in claim 1 wherein said turbine includes a dozen or more stages.

5. A turbine engine system as defined in claim 1 wherein means are provided for additionally water cooling said compressor and vaporization apparatus.

6. A turbine engine system as defined in claim 1 further comprising means for driving said compressors from said turbine, and means for providing a different speed of rotation of said compressors from that of said turbine.

7. A turbine engine system as defined in claim 2 wherein said turbine has a plurality of sets of radially extending turbine blades, and nozzle means are provided for initially directing the gases from said combustion chamber through said blades in one direction at one radial zone as measured from the axis of the rotor of the turbine, and additional means including guide vanes and nozzles are provided for directing said gases back through said blades in the opposite direction at a second radial zone which is spaced from said rotor axis by a different distance.

8. A turbine engine system as defined in claim 1 including means for maintaining a substantially stoichiometric fuel-to-air combustion ratio, whereby combustion is substantially complete and the generation of smog is minimized.

9. A turbine engine system as defined in claim 1 wherein said input fuel flow control apparatus includes means for varying the flow of input air to said engine system.

10. A turbine engine system as defined in claim 1 wherein said compressor and vaporization apparatus includes two four-stage compressor units.

11. A turbine engine system as defined in claim 1 including means for supplying sufficient water to said system to maintain the gases supplied to said turbine at a temperature below 1200 degrees F.

12. A turbine engine system as defined in claim 1 including means for supplying to said system more than twice as much water by weight than fuel, whereby the temperature of the gases supplied to the turbine is held to a low level.

13. A turbine engine system as defined in claim 1 wherein said compressor and vaporization apparatus includes at least one side channel radial displacement stage.

14. A turbine engine system as defined in claim 13 wherein said side channel radial displacement stage includes a circumferential channel and a rotor blade extending into and substantially filling said circumferential channel.

15. A turbine engine system as defined in claim 1 wherein said superheating chamber encloses said primary combustion chamber.

16. A turbine engine system as defined in claim 1 further comprising muffler means including a rotating inner element for mixing ambient air with the exhaust from the turbine.

17. A turbine engine system as defined in claim 1 further comprising an exhaust passage from said turbine, an exhaust valve mounted in said passage, and means for controlling said exhaust valve in synchronism with said fuel feeding means to reduce exhaust flow at lower power levels, thereby reducing turbulence within the turbine.

18. A high pressure, low operating temperature, high efficiency turbine engine system comprising:

dual input flow control apparatus including means for controlling an input flow of fuel, and for separately and concurrently controlling a flow of input water;

dual compressor and vaporization apparatus including a primary air compressor, and means for feeding fuel from said flow control apparatus into said primary air compressor for complete vaporization as the air is compressed; and a secondary air compressor in heat transferring juxtaposition with said first air compressor, and means for feeding water from said flow control apparatus into said secondary compressor for complete vaporization of said water vapor as the air is compressed and heat is absorbed from said primary compressor; and means for separately providing compressed air containing vaporized fuel, and compressed air containing water vapor from said dual compressor apparatus;

a three chamber combustion assembly having a combustion chamber for burning said vaporized fuel and its associated compressed air, said combustion chamber having an associated superheating chamber in heat transferring relationship with said combustion chamber, and means for supplying the compressed air and water vapor from said dual compressor to said superheating chamber to superheat the water vapor, and means including mixing chamber for receiving the output from the combustion chamber following initial burning, and the superheated steam and compressed air from said superheating chamber, and thoroughly commingling them;

a low temperature, low speed turbine; said turbine being a multi-stage transverse flow turbine having an inlet connected to receive the gases from combined superheated steam and combustion products, said turbine including a plurality of sets of radially extendg turbine blades, and nozzle means for initially directing said gases through said blades in one direction at a first radial zone as measured from the axis of the rotor of the turbine, and additional means including guide vanes and nozzles for directing said gases back through said blades in the opposite direction at a second radial zone which is spaced from said rotor axis by a different distance; and means for supplying the mixed output from said combustion assembly to the inlet of said turbine.

19. A turbine engine system as defined in claim 18 further comprising an exhaust valve connected to the output of said turbine, and means for controlling the variable flow of fuel and water to said dual compressor apparatus and for concurrently controlling the opening of said exhaust valve to minimize turbulence within said turbine.

20. A high pressure, low operating temperature, high efficiency turbine engine system comprising:

dual input flow control apparatus including means for controlling an input flow of fuel, and means for concurrently controlling a flow of input water;

dual compressor and vaporization apparatus including a primary air compressor, and means for feeding fuel from said flow control apparatus into said primary air compressor for complete vaporization as the air is compressed, and a secondary air compressor in heat transferring juxtaposition with said first air compressor, and means for feeding water from said flow control apparatus into said secondary compressor for complete vaporization of said water vapor as the air is compressed and heat is absorbed from said primary compressor; and means for separately providing compressed air containing water vapor from said dual compressor apparatus;

a three-chamber combustion assembly having a combustion chamber for receiving and burning said vaporized fuel and its associated compressed air, said combustion chamber having an associated superheating chamber in heat transferring relationship with said combustion chamber, and means for supplying the combined compressed air and water vapor from said dual compressor to said superheating chamber to superheat the water vapor, and means including a mixing chamber for receiving the output from the combustion chamber following burning, and the superheated steam and compressed air from said superheating chamber, and thoroughly commingling them;

a low temperature, low speed turbine; said turbine being a multi-stage transverse flow turbine having an inlet connected to receive the gases from the combined superheated steam and combustion products, said turbine including a plurality of sets of radially extending turbine blades, and nozzle means for initially directing said gases through said blades in one direction at a first radial zone as measured from the axis of the rotor of the turbine, and additional means including guide vanes and nozzles for directing said gases back through said blade in the opposite direction at a second radial zone which is spaced from said rotor axis by a different distance; and means for supplying the mixed output from said combustion assembly to the inlet of said turbine.

21. A turbine system as defined in claim 20 wherein said flow control apparatus is a dual input flow control apparatus including means for controlling the input flow of fuel, and for separately and concurrently controlling the flow of input water.

22. A turbine system as defined in claim 20 further comprising a floating muffler assembly to mix the ambient air with the exhaust gases from said turbine to cool said exhausted gases, and eliminate jet noises.

23. A turbine engine system as defined in claim 20 wherein said turbine is a multi-stage integrated impulse transverse flow double tier turbine with every expansion stage partial admission and every disk stage functioning as a full flow stage without any blank spaces between stages.

24. A turbine engine system as defined in claim 20 wherein the said turbine is provided with a plurality of expansion and disk stage means to fully accommodate the rate of increase of the specific volume of gas flow without inactive or blank spaces between stages.

25. A turbine engine system as defined in claim 20, wherein the turbine includes means to expand the flow through multiple stages to lower the rotational speed of said turbine.

26. A turbine engine system as defined in claim 20, including means to expand the gas flow through a multiplicity of stages to lower the pressure drop per stage to a minimum and to thereby extract the maximum possible useful energy from the flow through the said stages.

27. A turbine engine system as defined in claim in claim 20, wherein said turbine with additional energy supplied by the superheated steam includes means for providing specific fuel consumption of about 0.110–0.120 pounds of fuel per pound of flow per Bhp per hour.

28. A turbine engine system as defined in claim 20, wherein said turbine includes means for directionally changing the flow to make said flow through said turbine axial flow, parallel to the longitudinal axis of said turbine at each tier of the flow channels.

29. A turbine engine system as defined in claim 28, including means for maintaining the relative velocity of the flow at each stage of each tier of blades substantially the same.

30. A turbine engine system as defined in claim 23, wherein the turning angle of interstage stators and blades is substantially the same at each tier of the turbine disk.

31. A turbine engine as defined in claim 23, wherein all flow channels in each tier of the said disk are of substantially the same magnitude, and height.

32. A turbine engine as defined in claim 23, including means for controlling the rate of conversion of potential energy into kinetic energy per stage at each tier to be substantially of the same magnitude.

33. A turbine engine system as defined in claim 20, said turbine including means for operating at approximately 1100 degrees F., and including means to develop about 220–250 hp equivalent, with a fuel ratio of approximately 0.20 to 0.25 of steam and 0.74 to 0.69 of hot gases, at the input to the turbine.

34. A turbine engine system as defined in claim 20, further comprising an exhaust passage from the said turbine, and an exhaust valve in the said exhaust passage, and means for closing said valve and throttling the flow through said turbine at low level power operation with reduced volume flow through the blade passages, to impede the flow and cause the turbine to operate at full blade passages to simulate full design point operating at its highest point of efficiency at low loads.

35. A turbine engine system as defined in claim 20, wherein said compressor and vaporization apparatus includes two multi-stage compressors with each compressor including one centrifugal stage, two direct drive stages, and one circular flow centrifugal type stage, with the two compressors being mounted back to back.

36. A system as defined in claim 35, wherein said direct drive stages include circumferential channels and rotor blades extending into and substantially filling said circumferential channels cross-sectionally.

37. A system as defined in claim 35, wherein the said two circular flow compressors include means for causing isothermal compression, whereby the temperatures of the air when leaving the unit after compression will be substantially the same as the entering air.

38. A system as defined in claim 35, including means to feed fuel into a primary, isothermal, section of said compressor and water to a secondary section of said compressor, also isothermal, for complete vaporization of said water, with the heat of the compression processes being absorbed by the water and fuel in respective chambers of the said back-to-back compressors.

39. A system as defined in claim 35, further comprising means for driving said compressor at a different rotational speed from that of the turbine.

40. A system as defined in claim 35, including means for feeding fuel into the primary compressor, premixing with air, atomizing, and vaporizing said fuel to about its ignition point before entering the combustion chamber.

41. A system as defined in claim 35 including means for premixing fuel and air under compression, whereby substantially any kind of fuel that can be premixed may be employed.

42. A system as defined in claim 35 including a driving compressor wheel in each compressor with two vanes attached to each driving compressor wheel to act as direct drive compressors in side channels to provide a positive displacement type of operation, with the one at the inner level forcing gas flow from the first stage of the compressor into the third stage, the second one also attached to the driving compressor wheel forcing the flow along the upper channels to create suction, and to force the compressed gas flow into the combustion chamber.

43. A turbine engine system as defined in claim 20, including means for the complete combustion of the fuel at stoichiometric fuel/air ratios of said fuel.

44. A turbine engine system as defined in claim 20 wherein said superheating chamber encloses the primary combustion chamber, whereby energy losses by radiation and conduction are minimized.

45. A turbine engine system as defined in claim 44, wherein said combustion assembly includes means to convert vaporous flow from the secondary compressor into superheated steam.

46. A turbine engine system as defined in claim 20, said system including means for the complete combustion and washing of said combustion products by the said superheated steam to eliminate smog from vehicle exhaust.

47. A turbine engine system as defined in claim 20, including means to combine the combustion products of said combustion chamber with the said products of the superheating chamber to generate an alternate fuel "Gasteam" to consist of fuel (gasoline) approximately 6%, steam about 20%-25%, depending upon the required temperature of the flow of the turbine and about 69% to 74% air, (hot gases).

48. A turbine engine system as defined in claim 44 wherein the said enclosing chamber is provided with helical path for the vaporous flow, said helical passageway constituting a heat exchanger.

49. A turbine engine combustion system as defined in claim 20, wherein said combustion chamber is provided with baffle plates to generally synchronize the flow through said combustion chamber with the flow within the superheating chamber.

50. A turbine engine system as defined in claim 21, wherein means are provided to maintain substantially stoichiometric fuel-to-air ratio by weight, and similarly to maintain water-air ratios commensurate with the inlet flow of air to the primary compressor.

51. A turbine engine system as defined in claim 22, wherein said system includes means to disperse or prevent the formation of any mist at the exhaust due to possible wet steam and eliminate or silence jet noises.

52. A turbine engine complex as defined in claim 42, wherein means including the compressor side channel drive mechanisms are provided to preclude surges and prevent stalling.

* * * * *